(12) United States Patent
Wei et al.

(10) Patent No.: US 11,774,974 B2
(45) Date of Patent: *Oct. 3, 2023

(54) ADAPTIVE DYNAMIC MODEL FOR AUTOMATED VEHICLE

(71) Applicant: Motional AD LLC, Boston, MA (US)

(72) Inventors: Junqing Wei, Bridgeville, PA (US); Ludong Sun, Pittsburgh, PA (US); Zachary Thomas Batts, Pittsburgh, PA (US); Jarrod M. Snider, Pittsburgh, PA (US); Junsung Kim, Austin, TX (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,002

(22) Filed: Apr. 26, 2021

(65) Prior Publication Data

US 2021/0247772 A1   Aug. 12, 2021

Related U.S. Application Data

(62) Division of application No. 15/622,284, filed on Jun. 14, 2017, now Pat. No. 10,990,102.

(51) Int. Cl.
*G05D 1/02*   (2020.01)
*G07C 5/08*   (2006.01)
(Continued)

(52) U.S. Cl.
CPC ....... *G05D 1/0214* (2013.01); *B60C 23/0408* (2013.01); *B60W 10/18* (2013.01);
(Continued)

(58) Field of Classification Search
CPC .. G05D 1/0214; G05D 1/0066; G05D 1/0072; G05D 2201/0213; B60C 23/0408; B60W 10/18; B60W 10/20; B60W 30/02; B60W 30/12; B60W 2552/30; B60W 2510/18; B60W 2510/202; B60W 2520/10; B60W 2520/28; B60W 2530/20; B60W 2710/18; B60W 2710/202;
(Continued)

(56) References Cited

U.S. PATENT DOCUMENTS 9,944,317 B2 *   4/2018   Lee .................. B60W 30/09
10,023,138 B1 *  7/2018   Lurie ................ B60R 16/0231
(Continued)

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
(Continued)

*Primary Examiner* — Hussein Elchanti
(74) *Attorney, Agent, or Firm* — Fish & Richardson P.C.

(57) ABSTRACT

An operating system for an automated vehicle includes a failure-detector and a controller. The failure-detector detects a component-failure on a host-vehicle. Examples of the component-failure include a flat-tire and engine trouble that reduces engine-power. The controller operates the host-vehicle based on a dynamic-model. The dynamic-model is varied based on the component-failure detected by the failure-detector.

12 Claims, 2 Drawing Sheets

(51) Int. Cl.

| | | |
|---|---|---|
| B62D 6/10 | (2006.01) | |
| B62D 15/02 | (2006.01) | |
| B60W 10/20 | (2006.01) | |
| B60W 10/18 | (2012.01) | |
| B60W 30/12 | (2020.01) | |
| B60W 30/02 | (2012.01) | |
| G05D 1/00 | (2006.01) | |
| B60C 23/04 | (2006.01) | |
| G01L 5/22 | (2006.01) | |

(52) U.S. Cl.
CPC ............ *B60W 10/20* (2013.01); *B60W 30/02* (2013.01); *B60W 30/12* (2013.01); *B62D 6/10* (2013.01); *B62D 15/021* (2013.01); *B62D 15/025* (2013.01); *G01L 5/221* (2013.01); *G05D 1/0066* (2013.01); *G05D 1/0072* (2013.01); *G07C 5/0808* (2013.01); *B60W 2510/18* (2013.01); *B60W 2510/202* (2013.01); *B60W 2520/10* (2013.01); *B60W 2520/28* (2013.01); *B60W 2530/20* (2013.01); *B60W 2552/30* (2020.02); *B60W 2710/18* (2013.01); *B60W 2710/202* (2013.01); *B60W 2720/10* (2013.01); *B60W 2720/28* (2013.01); *G05D 2201/0213* (2013.01)

(58) Field of Classification Search
CPC . B60W 2720/10; B60W 2720/28; B62D 6/10; B62D 15/021; B62D 15/025; G01L 5/221; G07C 5/0808
See application file for complete search history.

(56) References Cited

U.S. PATENT DOCUMENTS

| 10,431,089 | B1 | 10/2019 | Nguyen | |
|---|---|---|---|---|
| 10,990,102 | B2* | 4/2021 | Wei | B60W 50/029 |
| 2002/0032513 | A1* | 3/2002 | Faye | B60K 31/00 |
| | | | | 180/170 |
| 2007/0032913 | A1* | 2/2007 | Ghoneim | B60W 40/10 |
| | | | | 701/1 |
| 2007/0179735 | A1 | 8/2007 | Fiedler et al. | |
| 2008/0119993 | A1* | 5/2008 | Breed | G08G 1/166 |
| | | | | 701/45 |
| 2008/0238718 | A1* | 10/2008 | Jung | B62D 15/025 |
| | | | | 340/901 |
| 2009/0030581 | A1* | 1/2009 | Pollklas | B60C 23/00 |
| | | | | 701/50 |
| 2009/0187343 | A1* | 7/2009 | Koch-Groeber | B60W 40/04 |
| | | | | 701/301 |
| 2009/0318121 | A1* | 12/2009 | Marumoto | G07C 5/085 |
| | | | | 455/414.1 |
| 2012/0062745 | A1* | 3/2012 | Han | G08G 1/167 |
| | | | | 348/148 |
| 2012/0271540 | A1* | 10/2012 | Miksa | G08G 1/167 |
| | | | | 701/409 |
| 2013/0085975 | A1* | 4/2013 | Wellhoefer | B60R 21/0134 |
| | | | | 706/46 |
| 2013/0226431 | A1* | 8/2013 | Lu | B60W 30/16 |
| | | | | 701/96 |
| 2013/0253793 | A1* | 9/2013 | Lee | B60W 50/029 |
| | | | | 701/70 |
| 2013/0332016 | A1* | 12/2013 | Suzuki | F02D 41/021 |
| | | | | 701/22 |
| 2014/0005871 | A1 | 1/2014 | Saito | |
| 2014/0019522 | A1* | 1/2014 | Weng | H04L 67/12 |
| | | | | 709/203 |
| 2014/0035738 | A1* | 2/2014 | Kim | G08G 1/167 |
| | | | | 340/435 |
| 2014/0063250 | A1* | 3/2014 | Park | H04N 7/181 |
| | | | | 348/148 |
| 2014/0288831 | A1* | 9/2014 | Sinton | G01C 21/20 |
| | | | | 701/533 |
| 2016/0161270 | A1* | 6/2016 | Okumura | G08G 1/096725 |
| | | | | 701/23 |
| 2016/0280236 | A1 | 9/2016 | Otsuka | |
| 2016/0347129 | A1* | 12/2016 | Yamashita | B60C 19/00 |
| 2017/0113665 | A1* | 4/2017 | Mudalige | G08G 1/166 |
| 2017/0132334 | A1* | 5/2017 | Levinson | G01S 17/931 |
| 2017/0166203 | A1 | 6/2017 | Sugai | |
| 2017/0313304 | A1 | 11/2017 | Shiraishi et al. | |
| 2017/0369052 | A1 | 12/2017 | Nagy et al. | |
| 2017/0371338 | A1* | 12/2017 | Kamata | G05D 1/0274 |
| 2018/0154906 | A1* | 6/2018 | Dudar | B60W 50/0225 |
| 2018/0253963 | A1 | 9/2018 | Coelho de Azevedo | |
| 2018/0364721 | A1 | 12/2018 | Wei et al. | |
| 2019/0347879 | A1 | 11/2019 | Motomura et al. | |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

\* cited by examiner

ADAPTIVE DYNAMIC MODEL FOR AUTOMATED VEHICLE

CROSS-REFERENCE TO RELATED APPLICATION

This application is a division of and claims priority to U.S. patent application Ser. No. 15/622,284, filed Jun. 14, 2017, the entire contents of which is incorporated herein by reference.

TECHNICAL FIELD OF INVENTION

This disclosure generally relates to an operating system for an automated vehicle, and more particularly relates to a system that varies or adjusts a dynamic-model used to operate the vehicle to compensate for a component-failure of a component of the vehicle.

BACKGROUND OF INVENTION

It is known to use a dynamic-model of a host-vehicle to assist with the operation of the host-vehicle. For example, the dynamic model may indicate when brakes should be applied to prevent a collision, or a safe speed for an upcoming curve. However, if there is a component failure of the host-vehicle such as a flat-tire, the dynamic-model may no longer be suitable to operate the host-vehicle.

SUMMARY OF THE INVENTION

In accordance with one embodiment, an operating system for an automated vehicle is provided. The system includes a failure-detector and a controller. The failure-detector detects a component-failure on a host-vehicle. The controller operates the host-vehicle based on a dynamic-model. The dynamic-model is varied based on the component-failure detected by the failure-detector.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
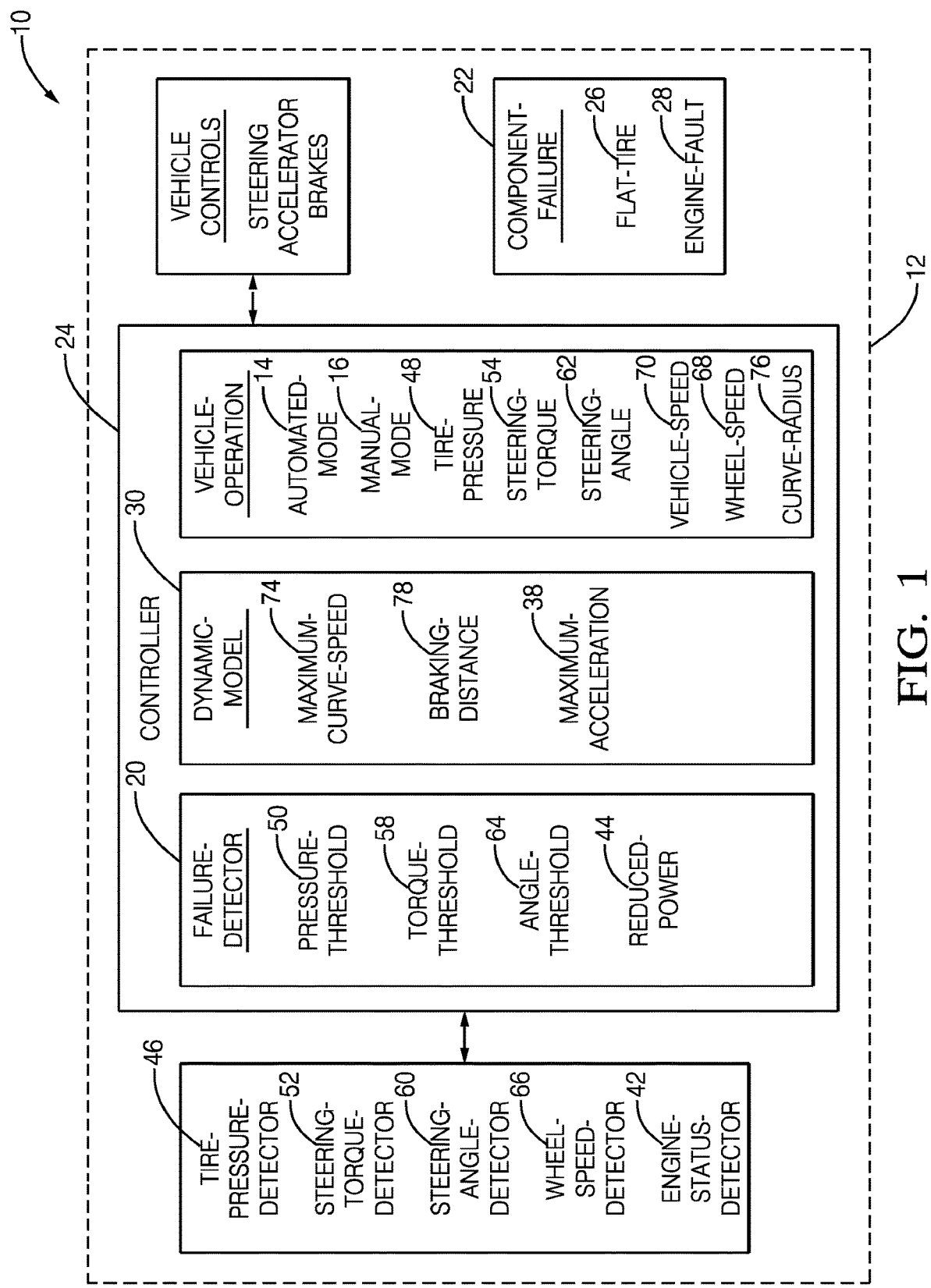
FIG. 1 is operating system for a host-vehicle in accordance with one embodiment.

FIG. 1 illustrates a non-limiting example of an operating system 10, hereafter referred to as the system 10. The system 10 is suitable for use by an automated vehicle, a host-vehicle 12 for example. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to avoid interference with and/or a collision with, for example, an object such as another-vehicle, a pedestrian, or a road sign.

The system 10 includes a failure-detector 20 that detects a component-failure 22 of a component on the host-vehicle 12. FIG. 1 illustrates the failure-detector 20 as being integrated into or part of a controller 24 of the system 10; however this is not a requirement. It is contemplated that the failure-detector 20 could be part of a separate engine-control-module (ECM) or a body-control-module (BCM) of the host-vehicle 12, and the failures could be communicated to the controller 24 on a data-buss of the host-vehicle 12, e.g. via a controller-area-network (CAN) buss. Non-limiting examples component failures of vehicle components whose failure could affect the operation of the host-vehicle 12 include, but are not limited to, a flat-tire 26, an engine-fault 28 (fuel-injector failure, engine-sensor failure), a perception-sensor failure (e.g. camera, radar, lidar; not shown), an anti-wheel-lock-sensor failure (not shown), a vehicle-accelerometer failure (not shown), an exterior-light failure (e.g. headlight or taillight; not shown), a low fluid level (oil, coolant, windshield-washer-fluid), and the like.

The controller 24 may include a processor (not specifically shown) such as a microprocessor or other control circuitry such as analog and/or digital control circuitry including an application specific integrated circuit (ASIC) for processing data as should be evident to those in the art. The controller 24 may include memory (not specifically shown), including non-volatile memory, such as electrically erasable programmable read-only memory (EEPROM) for storing one or more routines, thresholds, and captured data. The one or more routines may be executed by the processor to perform steps for operating the host-vehicle 12 as described herein.

The controller 24 operates the host-vehicle 12, e.g. controls steering and acceleration/braking, based on a dynamic-model 30. As used herein, the dynamic-model 30 represents a dynamic characterization of how the host-vehicle 12 will respond to various situations or stimuli. For example, the dynamic-model 30 may be used to predict a stopping-distance of the host-vehicle 12 based on information about traction-conditions (e.g. wet vs. dry roadway), roadway-slope (e.g. uphill/downhill vs. level), and the like. Prior examples of dynamic-models presume that all components on the vehicle being modeled are operating within normal parameters. For example, the prior dynamic-models presume that the tire-pressures in the tires of the vehicle are within some nominal range. However, if a flat-tire occurred, the prior dynamic-models are not particularly useful as they don't adapt to changes in dynamic behavior of the vehicle due to the flat-tire. The system 10 described herein is an improvement over the prior examples of dynamic-models because the dynamic-model 30 of the host-vehicle 12 is varied based on the component-failure 22 detected by the failure-detector 20.

Figure 2:
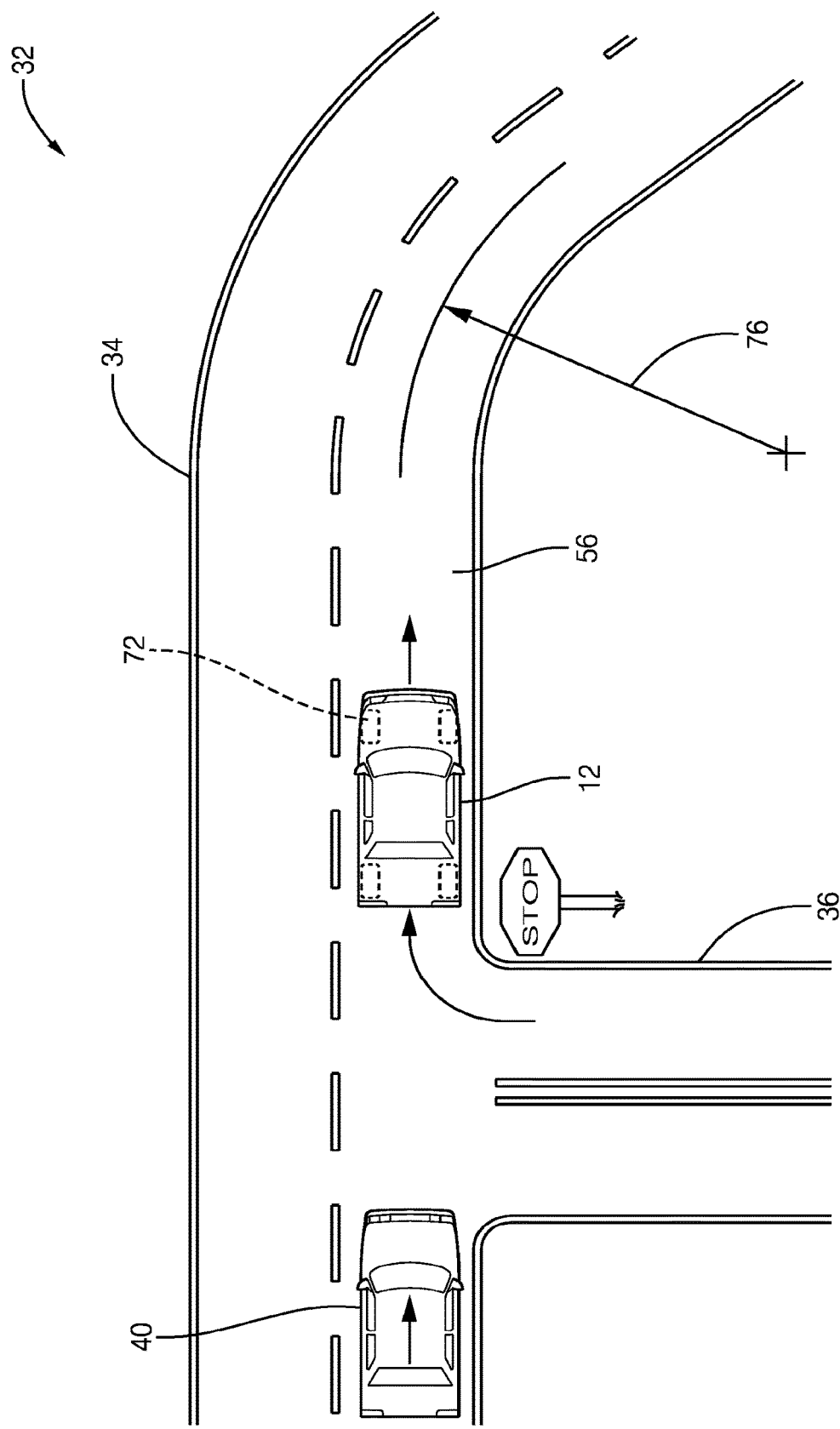
FIG. 2 is a traffic-scenario encountered by the host-vehicle equipped with the system of FIG. 1 in accordance with one embodiment.

FIG. 2 illustrates a non-limiting example of a traffic-scenario 32 that the host-vehicle 12, which is equipped with the system 10, may encounter. In this example, the host-vehicle 12 has recently turned onto a roadway 34 from a side-road 36. By way of example and not limitation, the dynamic-model 30 (FIG. 1) for the host-vehicle 12 may specify a maximum-acceleration 38 of the host-vehicle 12 that is considered prior to turning onto the roadway 34 so as to not interfere with an approaching-vehicle 40. That is, the system 10 may use the dynamic-model 30 to predict if the act of the host-vehicle 12 turning onto the roadway 34 will force the approaching-vehicle 40 to slow-down or decelerate an undesirable amount to avoid a collision with the host-vehicle 12. However, if there is something wrong with the engine of the host-vehicle 12, the host-vehicle 12 may not be able to accelerate at a rate comparable to the maximum-acceleration 38.

To address this situation, the system 10 may include an engine-status-detector 42 that operates to determine if the engine of the host-vehicle 12 is operating normally. The engine-status-detector 42 may be fully embedded in an engine-control-module (ECM, not shown) that outputs codes on a data-bus to indicate the operational status of the engine, as will be recognized by those in the art. If the engine is not operating properly, the component-failure 22 may be characterized as an engine-fault 28 when the engine of the host-vehicle 12 is operating at reduced-power, is operating in a limp-home mode. Accordingly, the maximum-acceleration 38 parameter of the dynamic-model 30 may be decreased when the engine of the host-vehicle 12 is operating at a reduced-power 44. As a result, the system 10 may decide to not turn onto the roadway 34 when the approaching-vehicle 40 is detected. As such, the dynamic-model 30 is varied based on the component-failure 22 detected by the failure-detector 20.

The system 10 may include a tire-pressure-detector 46, i.e. a tire-pressure-indicator. The component-failure 22 may indicate that the flat-tire 26 has occurred when a tire-pressure 48 is less than a pressure-threshold 50. The pressure-threshold 50 may be just barely above a completely flat-tire, or may be a pressure less than the recommended-pressure for a given tire where the dynamic behavior of the host-vehicle 12 is noticeably affected. It is also contemplated that multiple values of the pressure-threshold 50 may be used to continually adjust the dynamic-model 30 so that the flat-tire 26 covers both instances of a soft-tire and completely flat-tire. How the dynamic-model 30 is adjusted or varied may be determined by empirical testing and/or computer modeling. In situations when the host-vehicle is being operated on the manual-mode 16 where a human-operator is steering the host-vehicle 12, the adjustments to the dynamic model may be used by, for example, a lane-keeping-system that only operates to steer the host-vehicle when the operator allows the host-vehicle to deviate too far from the center of a travel-lane.

As a non-limiting example, if one of the front tires, e.g. the wheel 72 (FIG. 2), is soft or flat, the steering behavior may be asymmetrical. That is, the magnitude of change in direction of the host-vehicle 12 arising from a given magnitude of the steering-angle 62 for a left-turn may differ from that for a right-turn. For example, if the wheel 72 is the flat-tire 26, it may take a greater magnitude of the steering-angle 62 to turn the host-vehicle to the right that to make the same amount of turn to the left. The dynamic-model 30 may be varied or adjusted to anticipate this asymmetric behavior by increasing the expected change in steering necessary to steer the host-vehicle 12 through an upcoming curve.

The system 10 may include a steering-torque-detector 52 that monitors the amount steering torque applied to a hand-wheel (i.e. steering-wheel, not shown) operated by a human operator, or applied by an automated steering actuator of the host-vehicle 12. The component-failure 22 may indicate that a flat-tire 26 has occurred when a steering-torque 54 necessary to keep the host-vehicle 12 centered in a travel-lane 56 (FIG. 2) is greater than a torque-threshold 58. That is, the flat-tire 26 may cause the host-vehicle 12 to 'pull' in one direction, so a compensating steering torque is necessary to keep the host-vehicle 12 traveling near the center of the travel-lane 56. It is recognized that there are causes other than the flat-tire 26 that require a compensating steering torque to keep the host-vehicle 12 traveling near the center of the travel-lane 56. For example, a bent or worn suspension component may cause the same effect and the dynamic-model 30 may be adjusted to compensate in the same manner.

The system 10 may include a steering-angle-detector 60, and the component-failure 22 indicates that a flat-tire 26 has occurred when a steering-angle 62 necessary to keep the host-vehicle centered in the travel-lane 56 is greater than an angle-threshold 64. The effect on the dynamic behavior of the host-vehicle 12 due to the flat-tire 26 may be similar to the above described idea for compensating or adjusting the dynamic-model 30 based on the steering-torque 54. However, a commercially available example of the steering-angle-detector 60 may be more economical than a commercially available example of the steering-torque-detector 52.

The system 10 may include a wheel-speed-detector 66, and the component-failure 22 indicates that a flat-tire 26 has occurred when a wheel-speed 68 of a wheel 72 (FIG. 2) of the host-vehicle 12 does not correspond to a vehicle-speed 70 of the host-vehicle 12. Vehicles with anti-lock or anti-skid braking systems have a wheel-speed-detector at each wheel of a vehicle. The vehicle-speed 70 may be determined by taking an average wheel-speed of three wheels out of the four wheels that most agree with each other, and the fourth wheel that indicates a wheel speed most different from the other three may be presumed to be flat if the difference is greater than some threshold, one kilometer-per-hour (1 kph) for example. Alternatively, the vehicle-speed 70 may be determined using an independent means such as radar or lidar if the host-vehicle 12 is so equipped.

Once the component-failure 22 is identified, one or aspects or characteristics of the dynamic-model 30 may be varied, altered, or otherwise modified so the controller 24 has a version of the dynamic-model 30 that allows the system 10 to anticipate how the host-vehicle 12 is expected to respond to various inputs such as changes in the steering-angle 62, application of the brakes of the host-vehicle 12, or increasing engine power to accelerate the host-vehicle 12. By way of example and not limitation, the dynamic-model 30 may specify a maximum-curve-speed 74 for a curve-radius 76 of an upcoming curve of the travel-lane 56 (FIG. 2). If the component-failure 22 is something that reduces the ability of the host-vehicle 12 to safely navigate the upcoming curve, the dynamic-model 30 may be varied so the maximum-curve-speed 74 is decreased for a specified value of the curve-radius 78 when the component-failure 22 is, for example, a flat-tire 26, or a broken shock-absorber or spring of the suspension-system of the host-vehicle. Similarly, the dynamic-model 30 may specify a braking-distance 78 for a vehicle-speed 70 of the host-vehicle 12, and the braking-distance 78 may be increased when the component-failure 22 is a flat-tire 26.

Accordingly, an operating system (the system 10), a controller 24 for the system 10, and a method of operating the system 10 is provided. The dynamic-model 30 provides a means for the controller 24 to predict the dynamic-behavior of the host-vehicle 12 during various transient maneuvers such as cornering and braking. However, it has been observed that some types or instances of the component-failure 22 can change the dynamic-behavior. To overcome this change the dynamic-model 30 is varied or altered so that the dynamic-behavior of the host-vehicle 12 while the component-failure 22 is present can be predicted.

While this invention has been described in terms of the preferred embodiments thereof, it is not intended to be so limited, but rather only to the extent set forth in the claims that follow.

We claim:

1. A system comprising:
   a engine-status-detector configured to detect that an engine of an automated vehicle is operating at reduced-power;
   a processor configured to:
   adjust a dynamic-model of the automated vehicle based on the detected reduced-power, the dynamic-model representing a dynamic characterization of the automated vehicle;
   predict, using the adjusted dynamic model, a dynamic behavior of the automated vehicle in response to steering, braking, acceleration or deceleration of the automated vehicle; and
   a controller that operates the automated vehicle based on the predicted dynamic behavior.

2. The system in accordance with claim 1, wherein the dynamic-model is adjusted by decreasing a maximum-acceleration parameter of the dynamic-model.

3. The system in accordance with claim 1, wherein the controller operates the automated vehicle to operate in a limp-home mode.

4. The system in accordance with claim 1, wherein the controller operates the automated vehicle to not turn on a roadway where an approaching vehicle is detected.

5. A method comprising:
   detecting, with an engine-status-detector, that an engine of an automated vehicle is operating at reduced-power;
   adjusting, with at least one processor, a dynamic-model of the automated vehicle based on the detected reduced-power, the dynamic-model representing a dynamic characterization of the automated vehicle;
   predicting a dynamic behavior of the automated vehicle based on the adjusted dynamic model in response to steering, braking, acceleration or deceleration of the automated vehicle; and
   operating, with a controller, the automated vehicle based on the predicted dynamic behavior.

6. The method in accordance with claim 5, wherein the dynamic-model is adjusted by decreasing a maximum-acceleration parameter of the dynamic-model.

7. The method in accordance with claim 5, wherein the controller operates the automated vehicle to operate in a limp-home mode.

8. The method in accordance with claim 5, wherein the controller operates the automated vehicle to not turn on a roadway where an approaching vehicle is detected.

9. A non-transitory, computer-readable storage medium having instructions stored thereon that when executed by one or more processors, cause the one or more processors to perform operations comprising:
   detecting that an engine of an automated vehicle is operating at reduced-power;
   adjusting a dynamic-model of the automated vehicle based on the detected reduced-power, the dynamic-model representing a dynamic characterization of the automated vehicle;
   predicting a dynamic behavior of the automated vehicle based on the adjusted dynamic model in response to steering, braking, acceleration or deceleration of the automated vehicle; and
   operating, with a controller, the automated vehicle based on the predicted dynamic behavior.

10. The non-transitory, computer-readable storage medium in accordance with claim 9, wherein the dynamic-model is adjusted by decreasing a maximum-acceleration parameter of the dynamic-model.

11. The non-transitory, computer-readable storage medium in accordance with claim 9, wherein the controller operates the automated vehicle to operate in a limp-home mode.

12. The non-transitory, computer-readable storage medium in accordance with claim 9, wherein the controller operates the automated vehicle to not turn on a roadway where an approaching vehicle is detected.

* * * * *

UNITED STATES PATENT AND TRADEMARK OFFICE
CERTIFICATE OF CORRECTION

PATENT NO. : 11,774,974 B2
APPLICATION NO. : 17/241002
DATED : October 3, 2023
INVENTOR(S) : Junqing Wei et al.

It is certified that error appears in the above-identified patent and that said Letters Patent is hereby corrected as shown below:

In the Claims

Column 5, Line 13, in Claim 1, delete "a" and insert -- an --.

Signed and Sealed this
Nineteenth Day of December, 2023

Katherine Kelly Vidal
*Director of the United States Patent and Trademark Office*